(12) United States Patent
Krishnan et al.

(10) Patent No.: US 12,046,736 B2
(45) Date of Patent: Jul. 23, 2024

(54) MOISTURE AND CARBON DIOXIDE MANAGEMENT SYSTEM IN ELECTROCHEMICAL CELLS

(71) Applicant: FORM ENERGY, INC., Somerville, MA (US)

(72) Inventors: Ramkumar Krishnan, Scottsdale, AZ (US); Joel Hayes, Chandler, AZ (US); Shawn Fink, Sunnyvale, CA (US); Scott Klug, Mesa, AZ (US); Patrick Samuelson, Phoenix, AZ (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

(21) Appl. No.: 18/298,009

(22) Filed: Apr. 10, 2023

(65) Prior Publication Data

US 2024/0047786 A1 Feb. 8, 2024

Related U.S. Application Data

(63) Continuation of application No. 17/245,614, filed on Apr. 30, 2021, now Pat. No. 11,664,547, which is a
(Continued)

(51) Int. Cl.
*H01M 12/02* (2006.01)
*H01M 4/38* (2006.01)
(Continued)

(52) U.S. Cl.
CPC ............. *H01M 12/02* (2013.01); *H01M 4/38* (2013.01); *H01M 8/04014* (2013.01);
(Continued)

(58) Field of Classification Search
CPC ......... H01M 8/04014; H01M 8/04037; H01M 8/04097; H01M 8/04104; H01M 8/04141;
(Continued)

(56) References Cited

U.S. PATENT DOCUMENTS 6,436,576 B1 8/2002 Hossain
11,611,115 B2 3/2023 Pham et al.
(Continued)

FOREIGN PATENT DOCUMENTS

CN 104767006 A 7/2015
WO WO2012/138576 A1 10/2012
WO WO2020/067226 A1 4/2020

OTHER PUBLICATIONS

"Busbar," Lexico.com, US Dictionary, Oxford University Press, Retrieved on Oct. 13, 2021, 1 page, Retrieved from URL: https://www.lexico.com/en/definition/busbar.
(Continued)

*Primary Examiner* — Amanda C. Walke
(74) *Attorney, Agent, or Firm* — The Marbury Law Group, PLLC

(57) ABSTRACT

An electrochemical cell utilizes an air flow device that draws air through the cell from a scrubber that may be removed while the system is operating. The negative pressure generated by the air flow device allows ambient air to enter the cell housing when the scrubber is removed, thereby enabling continued operation without the scrubber. A moisture management system passes outflow air from the cell through a humidity exchange module that transfers moisture to the air inflow, thereby increasing the humidity of the air inflow. A recirculation feature comprising a valve allow a controller to recirculate at least a portion of the outflow air back into the inflow air. The system may comprise an inflow bypass
(Continued)

conduit and valve that allows the humidified inflow air to pass into the cell inlet without passing through the scrubber. The scrubber may contain reversible or irreversible scrubber media.

15 Claims, 11 Drawing Sheets

Related U.S. Application Data continuation of application No. 16/318,513, filed as application No. PCT/US2017/043489 on Jul. 24, 2017, now Pat. No. 11,018,387.

(60) Provisional application No. 62/365,866, filed on Jul. 22, 2016.

(51) Int. Cl.
*H01M 8/04007* (2016.01)
*H01M 8/04014* (2016.01)
*H01M 8/04089* (2016.01)
*H01M 8/04119* (2016.01)
*H01M 8/0668* (2016.01)
*H01M 12/06* (2006.01)
*H01M 12/08* (2006.01)

(52) U.S. Cl.
CPC ... *H01M 8/04037* (2013.01); *H01M 8/04097* (2013.01); *H01M 8/04104* (2013.01); *H01M 8/04141* (2013.01); *H01M 8/04149* (2013.01); *H01M 8/04179* (2013.01); *H01M 8/0668* (2013.01); *H01M 12/06* (2013.01); *H01M 12/08* (2013.01); *Y02E 60/10* (2013.01)

(58) Field of Classification Search
CPC ......... H01M 8/04149; H01M 8/04179; H01M 12/02
See application file for complete search history.

(56) References Cited

U.S. PATENT DOCUMENTS

| | | | |
|---|---|---|---|
| 2008/0145721 A1* | 6/2008 | Shapiro | H01M 12/08 429/410 |
| 2015/0140360 A1 | 5/2015 | Arthur et al. | |
| 2015/0295291 A1 | 10/2015 | Sata et al. | |
| 2017/0301922 A1 | 10/2017 | Goodenough et al. | |
| 2019/0006122 A1 | 1/2019 | Peled et al. | |
| 2019/0006695 A1 | 1/2019 | Swiegers et al. | |
| 2019/0229343 A1 | 7/2019 | Roumi et al. | |

OTHER PUBLICATIONS

"PTFE," Polymers: A Properties Database (Online), Taylor and Francis Group, LLC, Web, Sep. 5, 2014.
Office Action dated Mar. 28, 2017 in Chinese Application 201480017311.7, 21 pages.
Office Action dated May 7, 2021, issued in corresponding Chinese Patent Application No. 201780034966.9, with English translation, 18 pages.
Chinese Office Action dated Dec. 28, 2015 for Appln. No. 2012102393449.
Office Action for Chinese Application No. 201780034966.9, mailed Jan. 13, 2023, 19 pages.
Office Action for Chinese Application No. 201780034966.9, mailed Jul. 3, 2023, 31 pages.
Office Action for Chinese Application No. 201780034966.9, mailed Mar. 31, 2022, 7 pages.
Office Action issued in corresponding Japanese Patent Application No. 2017-093977 dated May 8, 2018 with English translation, 4 pages.
Song T., et al., "Solubility and Diffusivity of Oxygen in Ionic Liquids," Oct. 10, 2019, Journal of Chemical and Engineering Data, vol. 64, pp. 4956-4967.

* cited by examiner

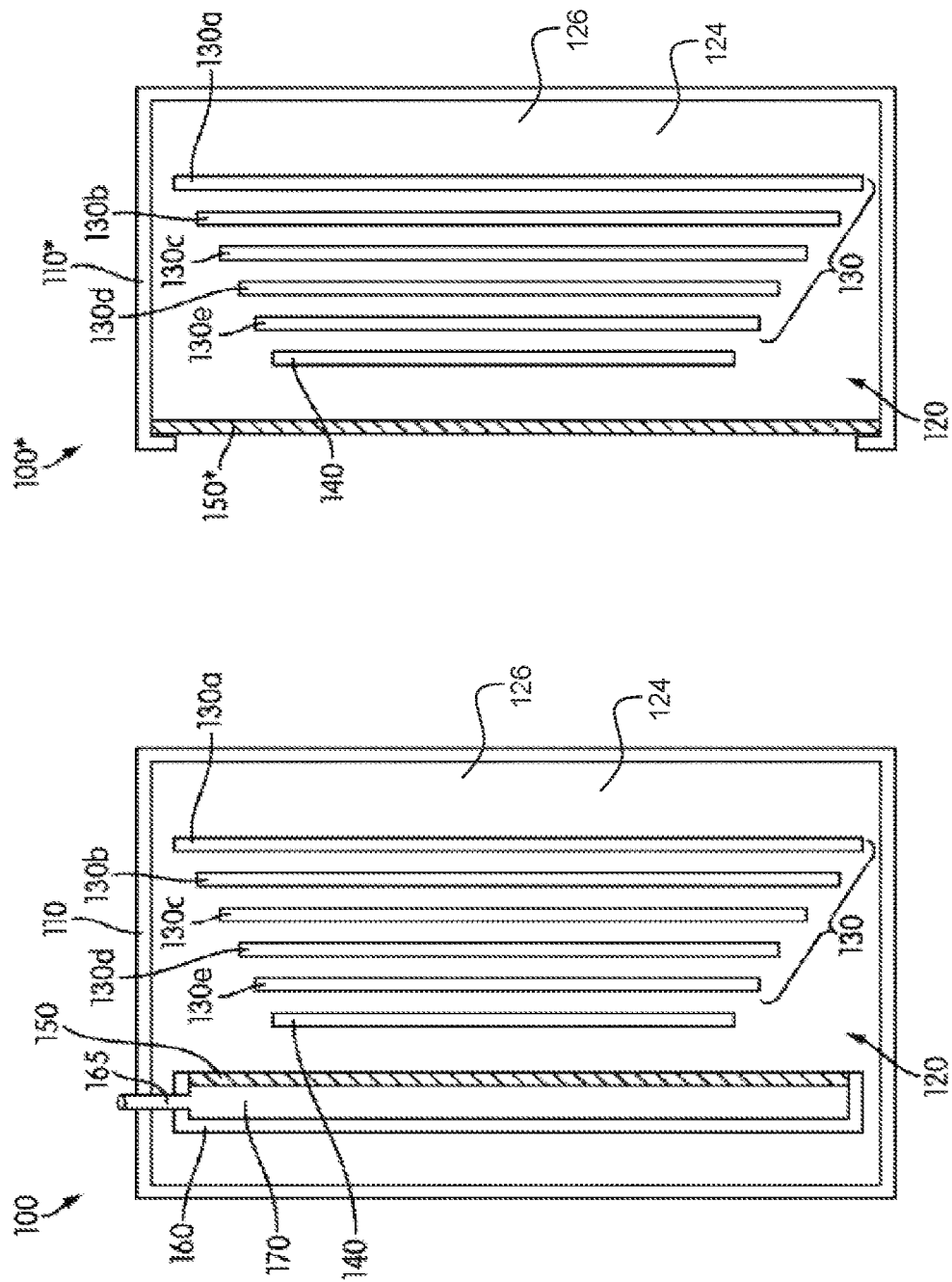

MOISTURE AND CARBON DIOXIDE MANAGEMENT SYSTEM IN ELECTROCHEMICAL CELLS

CROSS REFERENCE TO RELATED APPLICATIONS

This application is a Continuation of U.S. Ser. No. 17/245,614, filed Apr. 30, 2021, which is a Continuation of U.S. Ser. No. 16/318,513, filed Jan. 17, 2019, (now issued as U.S. Pat. No. 11,018,387), which is the U.S. National Phase of PCT/US2017/043489, filed Jul. 24, 2017, which claims priority to Provisional Patent Application Ser. No. 62/365,866, filed Jul. 22, 2016, the subject matter of each of which is incorporated by reference herein in its entirety.

BACKGROUND

Field

The present disclosure is directed to moisture and carbon dioxide management systems for electrochemical cells, and more in particular, to electrochemical cells comprising air breathing cathodes and utilizing a liquid ionically conductive medium.

Background

Many types of electrochemical cells utilize a liquid ionically conductive medium to support electrochemical reactions within the cell. Electrochemical cells may utilize an air breathing electrode coupled to a fuel electrode, comprising any suitable fuel. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In various ionically conductive mediums, evaporation, electrolysis (e.g. water splitting on recharge or during self-discharge) or other loss of moisture from the ionically conductive medium, may be detrimental to the electrochemical cell, particularly for cells requiring water to operate. For example, salting of the ionically conductive medium due to water loss, may clog an oxidant electrode of the electrochemical cell, reducing its performance or, in extreme cases, resulting in complete cell failure. Such salting or other failures may occur, for example, where an air-side of the oxidant electrode, or a portion thereof, is excessively dry. Additionally, a decrease in water content in the ionically conductive medium may decrease the medium's solvating capacity, i.e., its ability to dissolve solutes, or increase the percentage concentration of solutes in the medium, affecting the functionality of the ironically conductive medium.

Metal-air electrochemical cells are utilized in a wide variety of environmental conditions, including very hot and dry environments. These cells may have limited effectiveness and/or life as a result of the loss of moisture from the liquid ionically conductive medium.

Electrochemical cell water conservation and management systems have been developed such as U.S. patent application Ser. No. 14/176,888, filed Feb. 10, 2014, Fluidic Inc., which provides an example of a battery water management system; the entirety of which is hereby incorporated by reference in its entirety.

SUMMARY

The disclosure is directed to an electrochemical cell, such as a metal-air electrochemical cell that can effectively operate in a wide range of environmental conditions, including very arid environments. Many electrochemical reactions benefit from an oxygen rich air supply or an airflow with reduced carbon dioxide. In addition, in alkaline fuel cells or rechargeable battery systems comprising an alkaline electrolyte, carbon dioxide can react with the electrolyte to form potassium carbonate, which lowers the conductivity of the electrolyte by decreasing the hydroxide concentration and decreasing the solubility of a metal species, such as zinc. In addition, precipitation of carbonate within the pores of the air electrode can damage the electrode, expand the pore structure and lead to leakage. It is to be understood that some embodiments of the moisture, i.e. water, and carbon dioxide management system described herein, may be utilized in various electrochemical cells, including fuel cells and in particular, alkaline fuel cells and polymer electrolyte membrane (PEM) fuel cells. In alkaline electrochemical cells, such as metal-air batteries, that use air breathing electrodes which have open communication to air at ambient conditions, carbon dioxide is absorbed from the air into the electrolyte through the air breathing electrode, and moisture (water) is lost from the electrolyte to the air (ambient) through evaporation through the air breathing electrode. This disclosure utilizes multiple mechanisms and/or methods, e.g., four, to decrease the amount of carbon dioxide absorbed from the air and moisture lost to the air, e.g., in accordance with one embodiment: a carbon dioxide scrubber to remove carbon dioxide from the air prior to it entering the air breathing electrode chamber; a humidity exchange membrane (HEM) which transfers moisture lost through evaporation into the air stream leaving the air breathing electrode chamber back into the air stream entering the air breathing electrode chamber; an air recirculation mechanism that directs a portion of carbon dioxide depleted, humidity laden air leaving the air breathing electrode chamber back into the air stream entering the air breathing electrode chamber; and a vent filter that catches and returns electrolyte liquid droplets leaving the cell as a mist due to gas generated during normal cell electrochemical reactions and returning that liquid back to the cell. These mechanisms may operate independently or dependently to reduce the amount of carbon dioxide absorbed into the electrolyte and to reduce the amount of moisture lost from the cell.

The summary of the disclosure is provided as a general introduction to some of the embodiments of the disclosure, and is not intended to be limiting. Additional example embodiments including variations and alternative configurations of the disclosure are provided herein.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

FIG. 1 depicts a schematic view of an electrochemical cell having an immersed oxidant reduction electrode.

FIG. 2 depicts a schematic view of an electrochemical cell having an oxidant reduction electrode which defines a boundary wall for the electrochemical cell.

DETAILED DESCRIPTION OF THE ILLUSTRATED EMBODIMENTS

Figure 3:
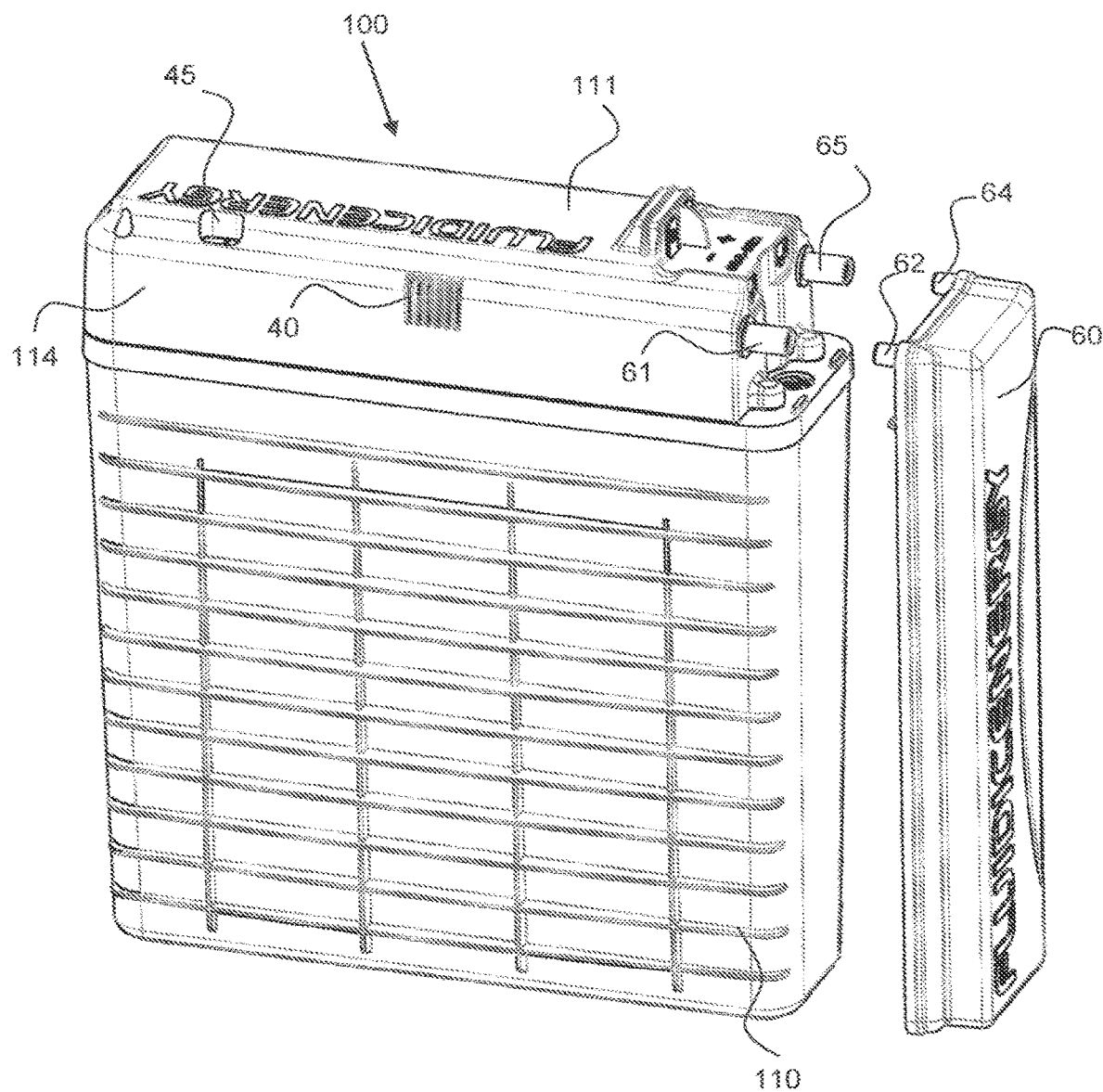
FIG. 3 shows a side perspective view of an exemplary electrochemical cell having a scrubber module that is detached from the cell housing.

Corresponding reference characters indicate corresponding parts throughout the several views of the figures. The figures represent an illustration of some of the embodiments of the present disclosure and are not to be construed as limiting the scope of the disclosure in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the disclosure. This description should be read to include one or at least one and the singular also includes the plural unless it is obvious that it is meant otherwise.

Certain exemplary embodiments of the present disclosure are described herein and are illustrated in the accompanying figures. The embodiments described are only for purposes of illustrating the present disclosure and should not be interpreted as limiting the scope of the disclosure. Other embodiments of the disclosure, and certain modifications, combinations and improvements of the described embodiments, will occur to those skilled in the art and all such alternate embodiments, combinations, modifications, improvements are within the scope of the present disclosure.

An exemplary moisture and carbon dioxide system in accordance with embodiments of this disclosure may comprise a recirculation mechanism wherein at least a portion of the air exiting the electrochemical cell is recirculated back into the air inflow to the cell. Many electrochemical cells produce heat and an exhaust flow that is high in humidity and therefore conserving this moisture through recirculation can effectively conserve the moisture in the system.

An exemplary moisture and carbon dioxide management system in accordance with embodiments of this disclosure comprises a humidity exchange membrane (HEM), for transfer of moisture from the outflow of air from a chamber containing the air breathing electrode of the electrochemical cell to the air inflow of said chamber. The HEM comprises a moisture exchange material, such as a membrane comprising an ionomer, such as perfluorosulfonic acid polymer, for example. A HEM separates air inflow to the cell from air exiting the electrochemical cell, such as from the oxidant reduction electrode air chamber, whereby moisture from the air exiting the cell is transferred through the humidity exchange membrane to the air inflow due to a relative humidity (RH) difference across the membrane (air outflow at high RH, air inflow at low RH). The air exiting the oxidant reduction electrode air chamber, or air chamber outflow, is warm and humid and therefore can carry a relatively high amount of moisture which enables the HEM to work effectively. This exiting air picks up moisture from the liquid ionically conductive medium as it flows through the cell and is heated due to the increased heat from the chemical reactions. The air chamber outflow may be hotter and contain a relatively high moisture content. For example, the air chamber outflow may be 10° C., 20° C., 30° C., or 40° C. hotter than the air inflow. The electrochemical reactions within the cell heat the air chamber and also humidify the air chamber air. For example, the air chamber outflow may have a relative humidity of more than about 70%, more than about 80%, more than about 90%, more than about 95%, and substantially fully saturated, depending on the flow rates, size of the system and environmental conditions. As an example, air inflow may be very dry, at only 20% relative humidity at 30° C. and may pass by a HEM module having air chamber outflow on the opposing side of the HEM at 90% relative humidity at 50° C., to increase the air inflow humidity to about 70% before entering the cell. A HEM may be configured in a module comprising multiple layers, folds, pleats or corrugations of the HEM to increase the amount of surface area that the air stream must flow over, thereby increase the amount of moisture transferred. In accordance with an embodiment, a marketed or manufactured HEM or HEM module may be used. An exemplary HEM or HEM module is available from DPoint Technologies, Vancouver, BC, Canada, for example, and may be used in the disclosed system. However, this example is not intended to be limiting.

An exemplary moisture and carbon dioxide management system in accordance with embodiments of this disclosure comprises a recirculation feature, such as a valve or other mechanism, that may be configured to reintroduce some of the air chamber outflow directly back into the air inflow, thereby increasing the moisture level of the air inflow. When an electrochemical cell is located in a very arid environment, recirculation of the outflow air into the air inflow can effectively conserve moisture in the system. A recirculation feature may be configured upstream, prior to the inflow air reaching the HEM, or downstream of the HEM. In one embodiment, it may be preferred to locate a recirculation feature upstream of the HEM, whereby the outflow air flows past the HEM, thereby maintaining the HEM in a warm moist state, prior to recirculation. As described herein, in some embodiments, a HEM may work more effectively when maintained in a warm and moist condition. A recirculation feature may be a valve that is operated by a control system or may be a baffle that is automatically controlled by pressure. A control system may monitor the moisture level within and external to the system, such as relative humidity, RH, of the air inflow, the air outflow, the ambient RH, the liquid electrolyte level and the like to determine when and how much recirculation to include into the air inflow. The air exiting the oxidant reduction electrode air chamber, or air chamber outflow, is warm and humid and a portion or amount thereof may be recirculated into the air inflow. In one embodiment, a valve is opened and closed to control when the air chamber outflow is recirculated and what portion or amount is recirculated. For example, in very arid environments, a high proportion of the air chamber outflow may be recirculated, such as about 40% or more, about 50% or more, about 70% or more, about 90% or more, or all of the air chamber outflow or any portion between and including the percentages provided. The remaining air chamber outflow may be passed through the air flow device and out of the cell.

For example, in one embodiment, an exemplary electrochemical cell may utilize a recirculation feature that provides about 50% of the inflow to the cell from air outflow from the cell. The ambient air, or inlet air may comprise about 400 ppm carbon dioxide, 50% RH, and 21.2% oxygen. The air outflow from the cell may have a reduced carbon dioxide concentration, such as about 0%, due to the scrubber and/or reaction within the cell, 100% RH, and a reduced oxygen concentration of about 12%. When the ambient air and air outflow from the cell are mixed through the recirculation feature the inlet airflow to the cell will have a 200 ppm carbon dioxide concentration, about 75% RH, and 18% oxygen. The electrochemical cell may be configured to run at a three or four stoichiometry for oxygen and therefore a slightly reduced oxygen concentration will not create a loss of power generation potential. In addition, there will be a large benefit from the increase humidity level and reduced carbon dioxide level which will result in extending the life of the electrochemical cell.

An exemplary moisture and carbon dioxide management system in accordance with embodiments of this disclosure comprises a mist elimination system that may be incorporated to control the loss of liquid ionically conductive medium, such as an electrolyte. A mist elimination system may comprise a baffle or valve, a filter, a hydrogen recombination catalyst, a neutralizer and a hydrophobic filter. An exemplary mist elimination system reacts hydrogen to form water that may be drained back into the electrochemical cell. Gasses produced during normal cell operation, such as for a metal-air cell during self-discharge or cell charge, rise to the surface of the electrolyte as bubbles which burst at the electrolyte surface. The action of the bursting bubble generates a fine mist of electrolyte which will leave the cell with the effluent gas stream. An exemplary mist elimination filter is placed in this gas stream to recapture this electrolyte mist and return it to the liquid electrolyte.

The operational relative humidity ranges, or humidity ranges within the air chamber, may depend on the particular ionically conductive medium, in addition to the temperature of ambient air and the cell, for example. It may be appreciated that aqueous salt electrolytes, e.g., potassium hydroxide, may be characterized as hygroscopic. For example, for a cell comprising an aqueous KOH electrolyte, a relative humidity less than ca. 50% may result in water loss through the oxidant reduction electrode, or air electrode. An ambient relative humidity greater than 80% (or greater than ca. 80%) may result in water uptake into the cell through the oxidant reduction electrode, or air electrode. Water release through the air electrode may occur at greater relative humidity than ca. 50% in an air temperature range of 50 degrees Celsius to 80 degrees Celsius. A relative humidity from 50% (inclusive) to 80% (inclusive), or in a mid-range, may be characterized as neutral. For example, at 70% relatively humidity into the cell, 250 ml of water may be lost at 50 degrees C., and only 15 ml (which is considered negligible in a cell having 8 liters total volume) is lost at 25 degrees C. It should be appreciated that the ranges may also and/or alternatively change depending on the ionically conductive medium and its hygroscopic/hygrophobic characteristics.

A variety of water management techniques are described herein and may be used with the disclosed system. U.S. patent application Ser. No. 15/077,341, to Fluidic Inc., filed on Mar. 22, 2016, entitled Water Management System In Electrochemical Cells with Vapor Return Comprising Air Electrodes describes some other water management systems and techniques and is incorporated, in its entirety, by reference herein.

An exemplary moisture and carbon dioxide management system in accordance with embodiments of this disclosure comprises a scrubber module for removing carbon dioxide, $CO_2$, from the air inflow to the cell. Some exemplary scrubber media, such as soda-lime, requires some moisture to react with the carbon dioxide. The scrubber media may absorb some moisture from the air inflow. This absorbed moisture may be reintroduced to the cell by heating of the scrubber. Heating may be passive heating, wherein heat generated from the cell is used to heat the scrubber, or a dedicated resistive heater element may be used to heat the scrubber.

An exemplary scrubber system operates more effectively when the incoming air to the scrubber is humidified and therefore receiving inflow air to the scrubber after passing through the HEM may improve overall system effectiveness. The scrubber may absorb some of the moisture from the airflow therethrough, and this absorbed moisture may be reintroduced to the cell by heating the scrubber. Heating may be passive heating, wherein heat generated from the cell is used to heat the scrubber, or a dedicated resistive heater element, controlled by the controller, may be used to heat the scrubber. In the case of passive heating, heat from the electrochemical cell may be conducted to the scrubber module and specifically to the scrubber media. Conductive elements may be configured to increase the amount of heating that his conducted to the scrubber media. In the case of active heating, an electrically resistive heating element is configured to heat the scrubber and/or scrubber media. Electrical current generated by the electrochemical cell may be passed through the electrically resistive heating element continuously or it may be turned on and off by a switch that is activated by the control system. Again, the control system may receive input values from one or more sensors that are used to activate the heating of the scrubber heater. In an exemplary embodiment, the electrochemical cell may be configured to run the airflow device even when the electrochemical cell is not operating to produce power, and thereby absorb moisture from the environment in the scrubber media which may be subsequently desorbed, or driven out of the scrubber media and into the electrochemical cell. For example, the control system may subsequently heat the scrubber media to drive off absorbed moisture from the scrubber media.

An exemplary scrubber comprises scrubber media that is reversible or irreversible. A reversible scrubber media may be reactivated by heating, for example, wherein the absorbed carbon dioxide is desorbed and driven off from the scrubber media. A reversible scrubber material may be reactivated by heating to about 70° C. or more, or about 90° C. or more. Therefore, a scrubber module that is configured to be heated to drive off absorbed moisture may also be reactivated when comprising a reversible scrubber media. When irreversible scrubber media reacts with the carbon dioxide it is changed chemically and is consumed. Scrubber media, irreversible or reversible, may be purged periodically to regulate the humidity level and in the case of reversible media, to drive off the absorbed carbon dioxide. A purge cycle may be run while a reversible scrubber media is heated to more effectively purge the desorbed carbon dioxide from the system. During a scrubber purge cycle, a flow of air through the scrubber may be reversed, wherein the air flow device, such as a fan, is reversed and therefore pushes air through the cell into the scrubber and out of the air inlet. In addition, the rate of flow of air through the scrubber may be increased, wherein the flow rate is higher, such as at least two times, three times, five times, ten times or more higher than a standard operational flow rate. This may be accomplished by increasing the fan speed, for example. In still another embodiment, a valve enables air to flow through the scrubber and then directly out of the outlet of the system without passing through the cell housing, and/or without passing by the HEM after it exits the scrubber.

A scrubber media may comprise media or material(s) selected from the group of: soda lime, sodium hydroxide, potassium hydroxide, and lithium hydroxide, lithium peroxide, calcium oxide, serpentinite, magnesium silicate, magnesium hydroxide, olivine, molecular sieves, amines, and monoethanolamine, and/or derivatives and/or combinations thereof. Amine scrubber media is reversible whereas soda lime is irreversible.

A scrubber configured to remove carbon dioxide from an air inflow to a metal-air electrochemical cell is described in U.S. patent application Ser. No. 15/077,341, to Fluidic Inc., filed on Mar. 22, 2016, entitled Water Management System In Electrochemical Cells with Vapor Return Comprising Air Electrodes and currently pending; the entirety of which is hereby incorporated by reference herein.

Various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126, that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. patent application Ser. No. 13/532,374 incorporated above in its entirety by reference.

Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent or substantially prevent seepage of ionically conductive medium therebetween. In some cases, however, such a configuration is generally not preferred, however, due to concerns that a failure of the oxidant reduction electrode 150* would result in leakage of the ionically conductive medium out of the cell 100*. Regardless, in some such embodiments the convective flow of the ionically conductive medium in the cell chamber 120, described in greater detail below, may be in a direction upwards and away from the oxidant reduction electrode 150*, across the top of the fuel electrode 130.

As shown in FIG. 3, an exemplary electrochemical cell 100 has a scrubber module 60 that is detachably attachable to the cell housing 110. The scrubber module 60 may be detached from the electrochemical cell while the electrochemical cell is running. Since air is drawn in to the cell by an airflow device, removal of the scrubber module still allows air to enter into the inflow port 65. This allows for removal of the scrubber module for maintenance or replacement without interfering with the operation of the electrochemical cell. In normal operation with the scrubber attached, air is drawn in through the air intake 40, into the scrubber through the outflow port 61 and into the inlet port 62 of the scrubber 60. The air then exits the scrubber through the outlet port 64 of the scrubber 60 and enters back into the cell housing through the inflow port 65. Air passes from the air inflow port 65 into the air chamber of the oxidant reduction electrode (not shown). A cover 111 is configured over the top of the electrochemical cell housing 110, or over the cell manifold assembly 114. The cover and manifold assembly help to protect the cell components from the elements and keep dust, rain and other environmental elements out. An exhaust vent 45 is configured as an outlet for gas venting from the interior chamber of the cell.

Figure 4:
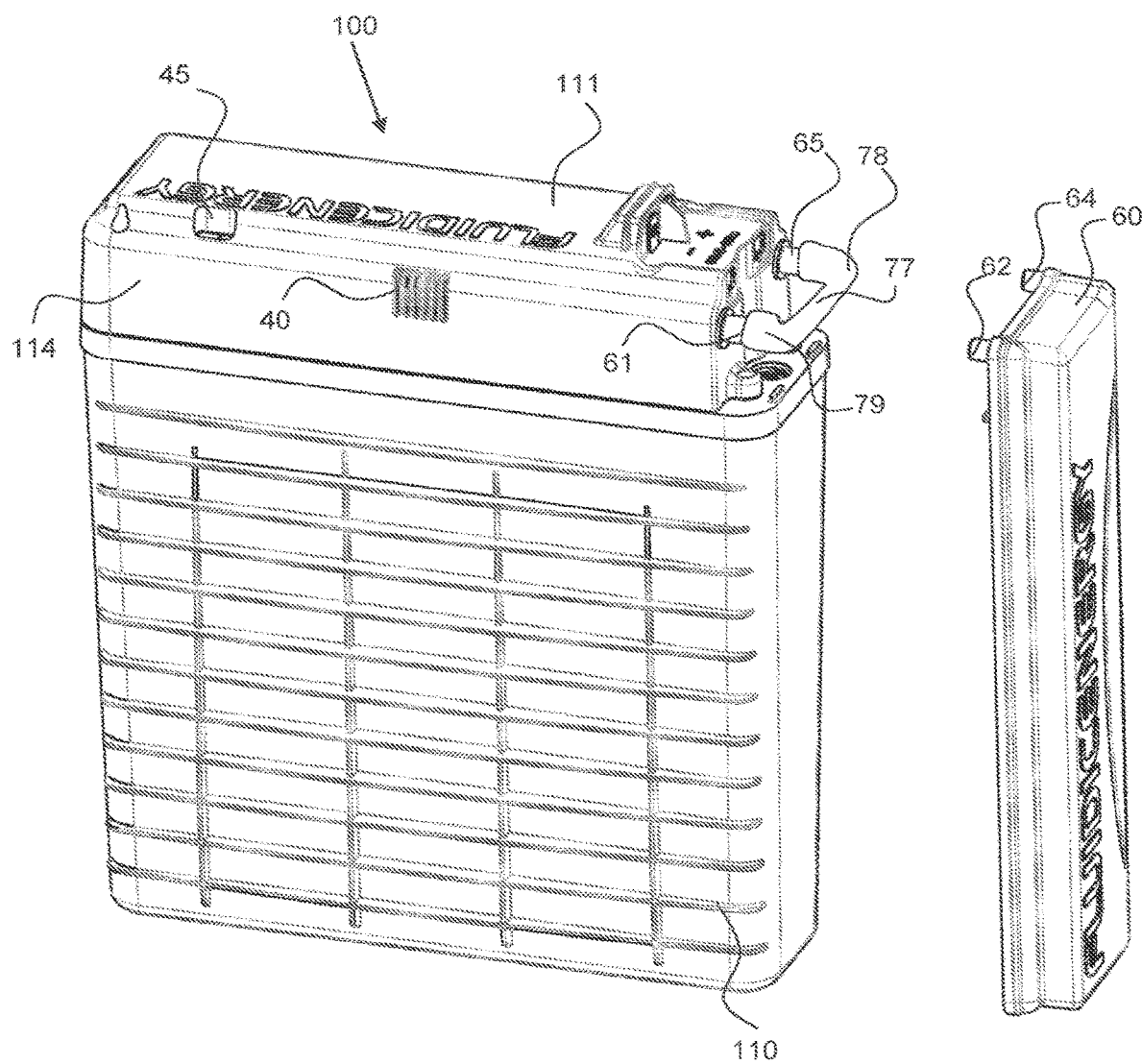
FIG. 4 shows a side view of an exemplary electrochemical cell having a scrubber module that is removed and a bypass adapter configured from the inflow port to the outflow port.
Figure 12:
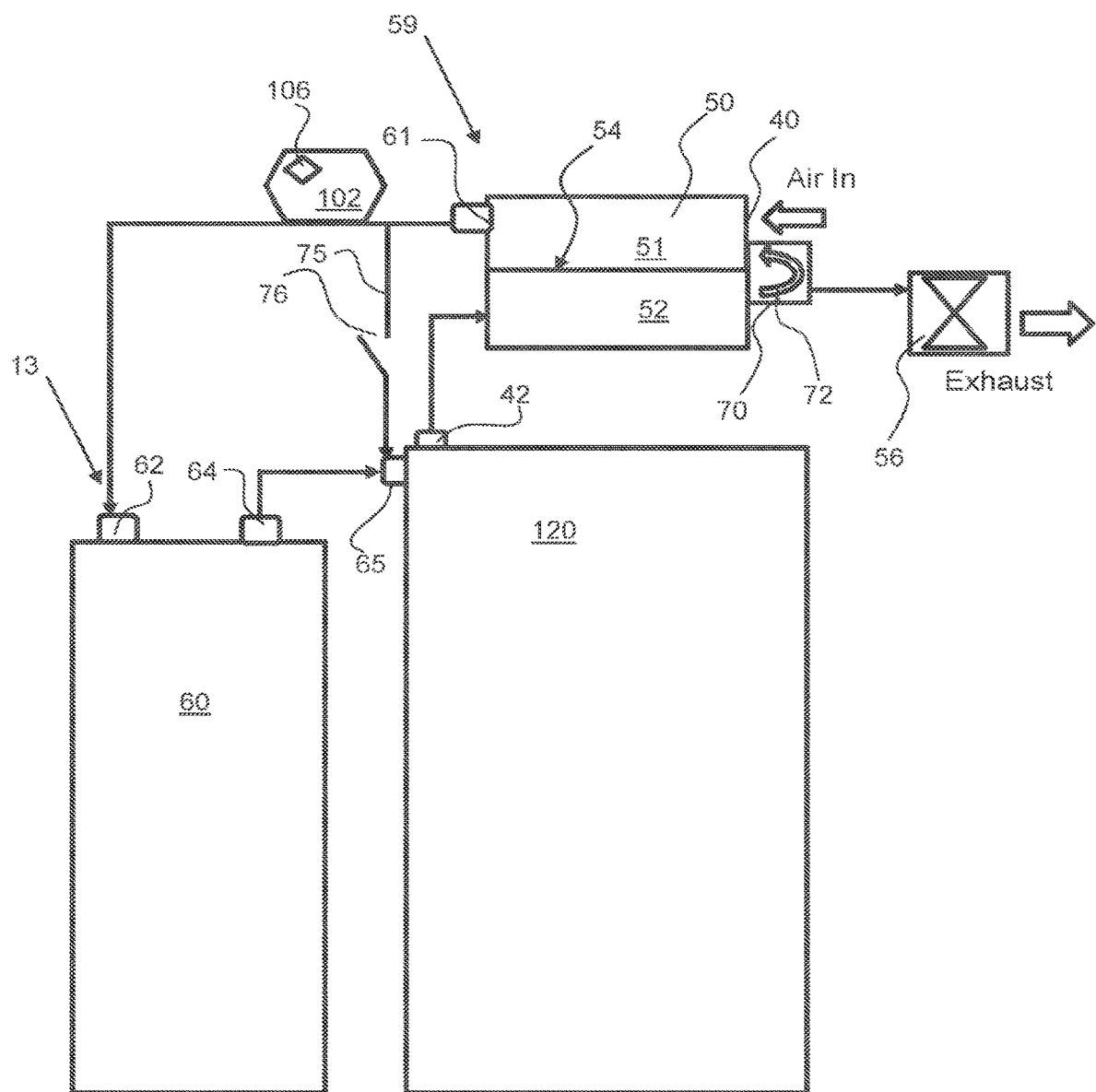
FIG. 12 shows a block diagram of a water management system.

As shown in FIG. 4, the scrubber module 60 is detached from the electrochemical cell 100 and a bypass adapter 77 extends from the outflow port 61 to the inflow port 65. Incoming airflow passes through the outflow port 61, into the outflow port end 79 of the bypass adapter, through the bypass adapter 77, out of the cell inflow end 78 of the bypass adapter and into the inflow port 65. The bypass adapter allows humid air inflow into the cell, when a HEM is utilized, while the scrubber is removed. The bypass adapter enables the cell to operate without the scrubber without any excessive moisture loss. The bypass adapter shown is a physical connector having an auxiliary conduit for passing inflow air into the inflow port. It is to be understood that this bypass flow may be accomplished through an inlet bypass conduit, configured as part of the cell, along with a valve to open flow up to an inlet bypass conduit, as shown in FIG. 12.

Figure 5:
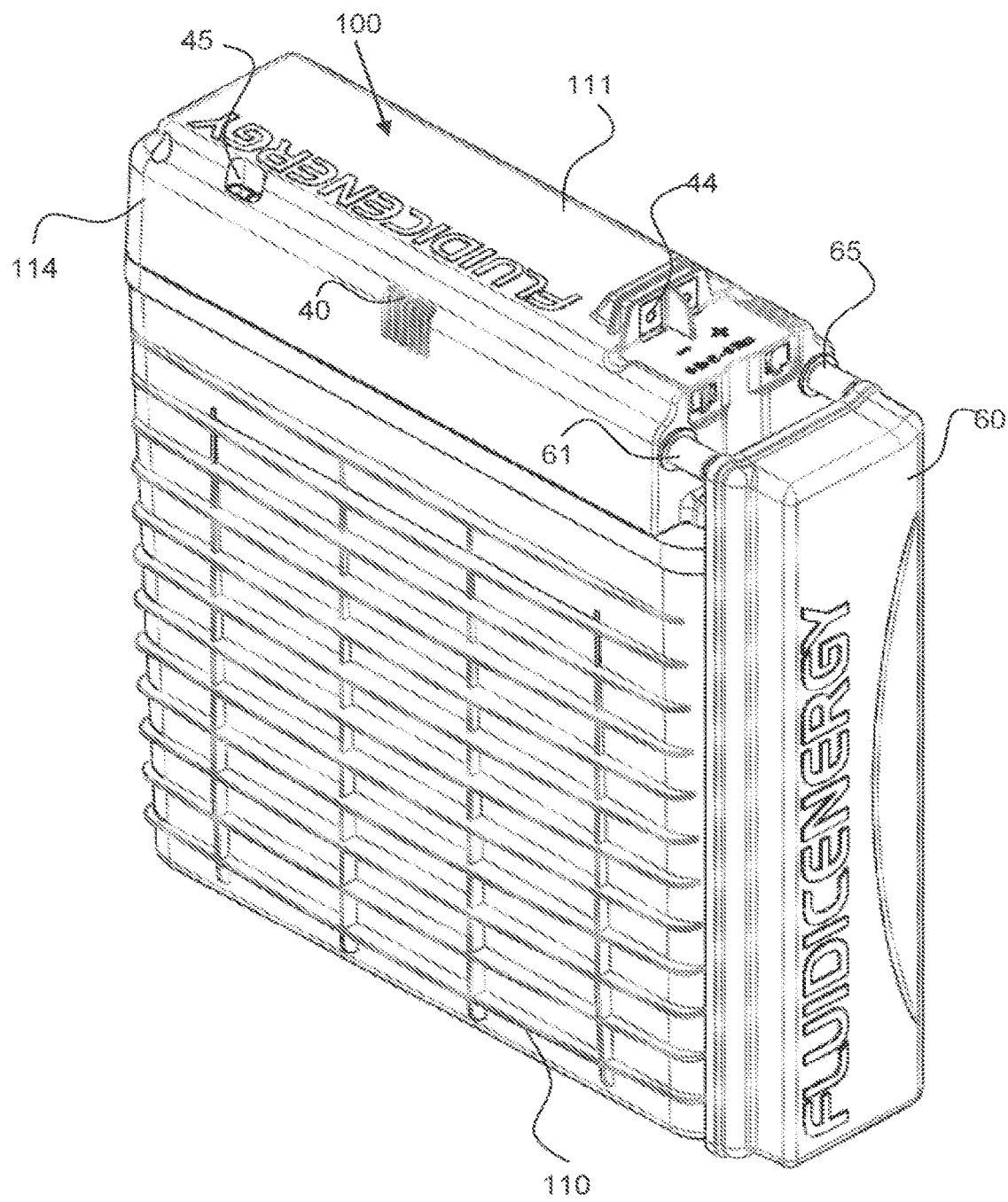
FIG. 5 shows a side view of an exemplary electrochemical cell having a scrubber module that is attached to the cell housing.

As shown in FIG. 5, the scrubber module 60 is attached to the outflow port 61 and inflow port 65 of the manifold assembly 114. The terminals of the cell 44 are shown extending from the manifold assembly 114.

Figure 6:
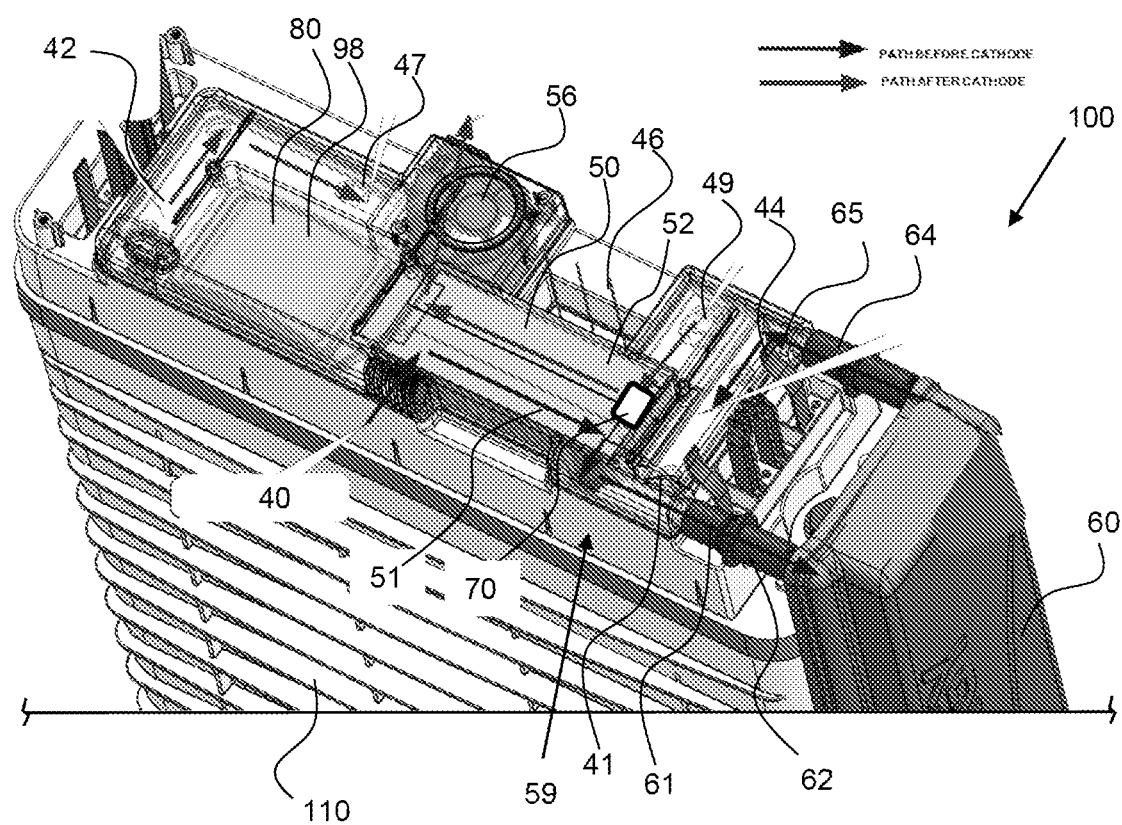
FIG. 6 shows a top view of an exemplary electrochemical cell having a moisture management system comprising a recirculation valve and scrubber.
Figure 7:
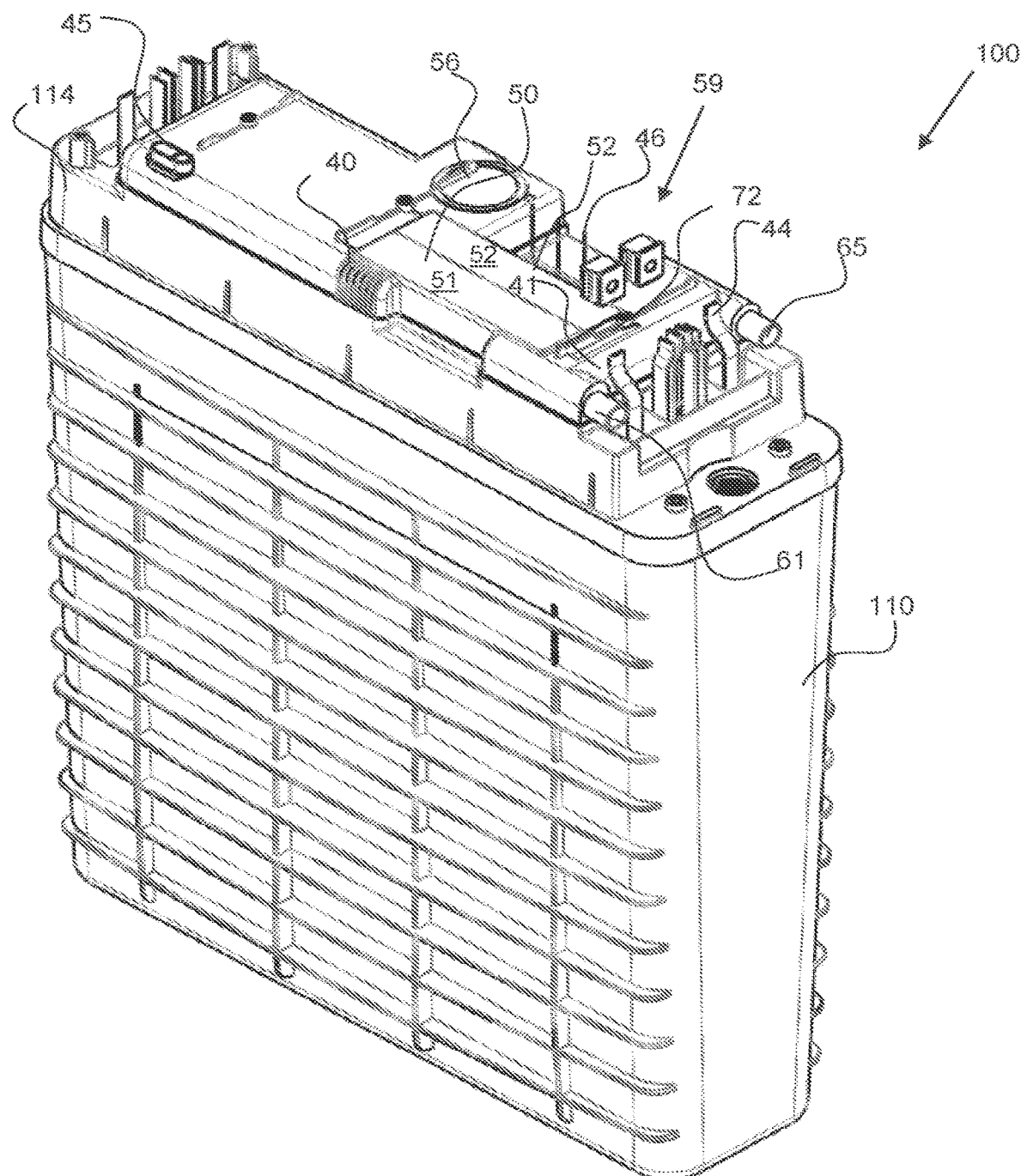
FIG. 7 shows a top perspective view of an exemplary electrochemical cell having a moisture management system.
Figure 8:
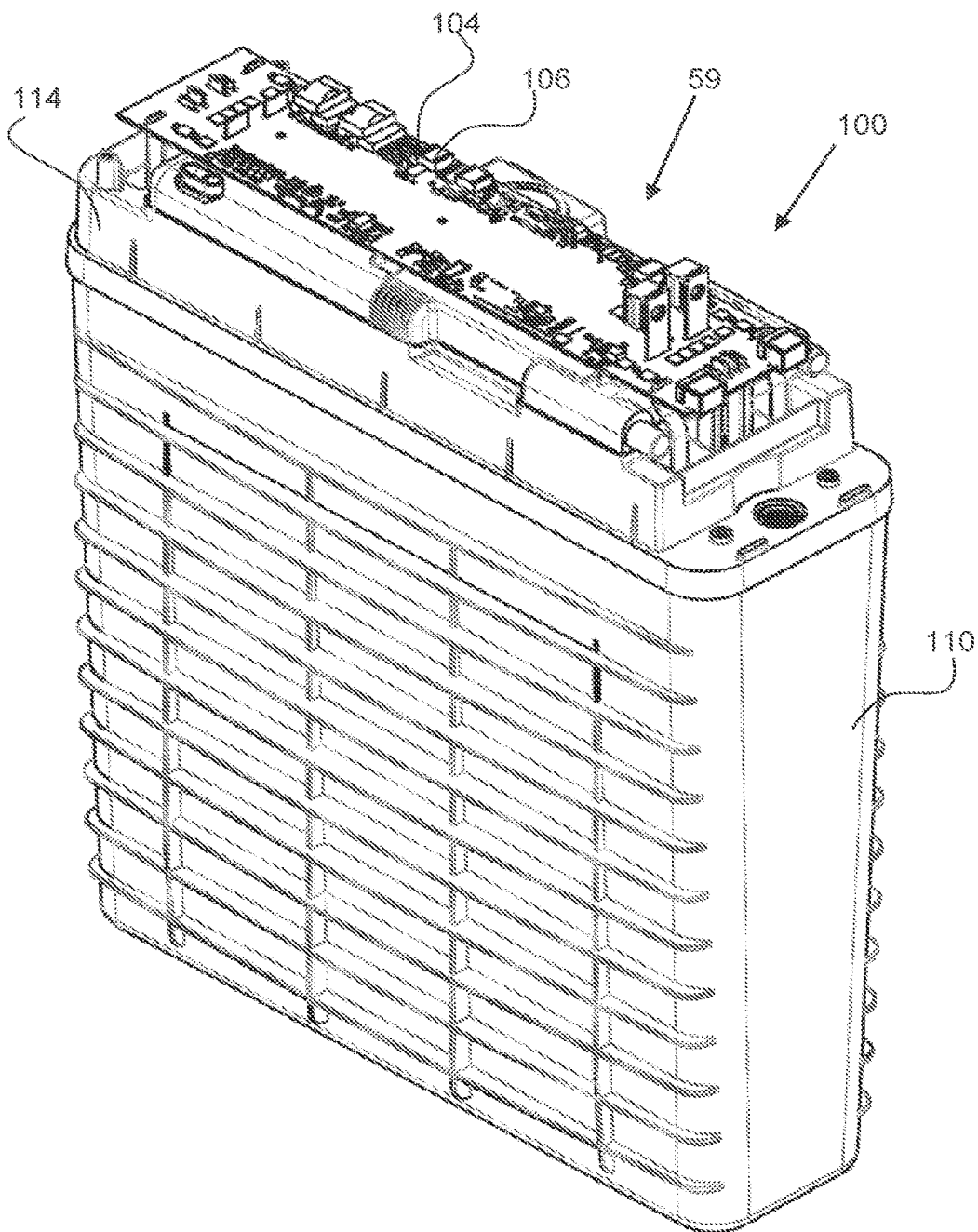
FIG. 8 shows a top perspective view of an exemplary electrochemical cell having a control system.

Referring now to FIGS. 6 to 8, an exemplary electrochemical cell 100 has a moisture management system 59 comprising a humidity exchange membrane module 50, recirculation feature 70, such as a valve or baffle, and scrubber 60. Ambient air enters the cell through the air intake 40 and is passed along the inflow side 51 of the HEM where it picks up moisture from the air flowing along the outflow side 52 of the HEM. The air then flows through the outflow port 61 and into the scrubber module 60 through the inlet port of the scrubber. The air then flows through the scrubber media, wherein carbon dioxide is removed from the airflow. The air then flows back into the cell housing 110 and into the cathode inlet 41, and subsequently into the oxidant reduction electrode air chamber. The air flows through the air chamber and out of the air chamber outlet 42, or cathode outlet, which is on an opposing end of the cell housing from the cathode inlet. The air then flows through an outflow bypass conduit that extends along the bottom of the manifold assembly 114. Air flows into the bypass inlet 47, through the outflow bypass conduit (not shown), and out of the bypass outlet 49. The airflow then flows over the outflow side 52 of the HEM. Some of the airflow may be diverted through a recirculation valve 70 back into the air inflow. The remainder of the air is drawn through the airflow device 56 and out of the cell housing. The cell terminals 44 are shown extending from the top of the cell housing 110. A plurality of sensor leads 46 are shown extending from the top of the electrochemical cell 100. As described herein, the sensor leads may measure the level of the electrolyte, and/or the humidity level of the air chamber. A control system 102, as shown in FIG. 8 may receive input from the sensor leads and open, close or adjust the amount of flow through the recirculation feature, or valve. The control system may change the amount of flow being drawn into the system and may draw air through the system even when the cell is not operating to produce power. The moisture in the air being drawn through the scrubber may be absorbed by the scrubber media and retained for later use, wherein the scrubber is heated either passively or actively by the system. The exemplary control system shown in FIG. 8 comprises a control circuit 104 and a microprocessor 106. The control system is configured on top of the manifold assembly 114 and a cover 111, as shown in FIG. 5, extends over the control system 102.

Figure 9:
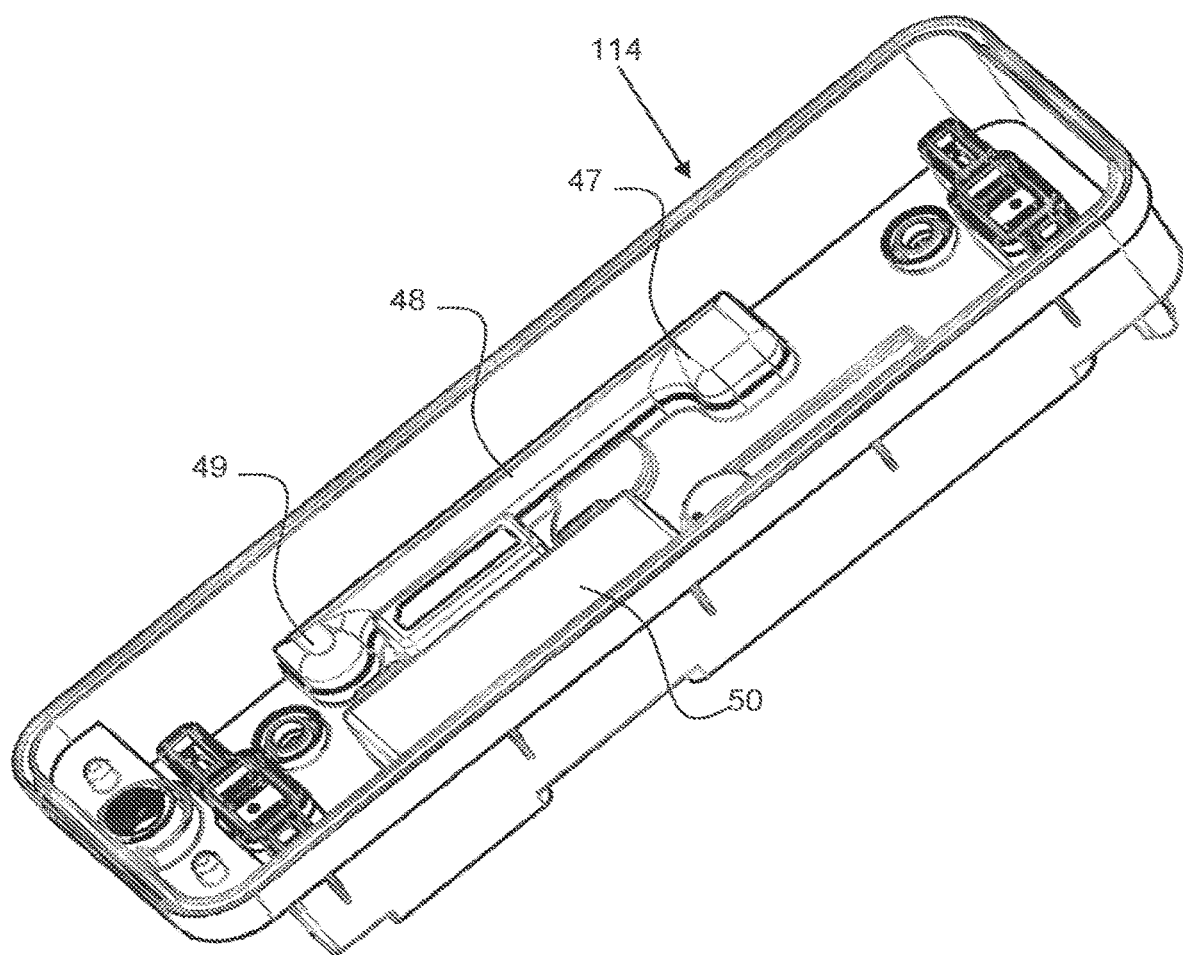
FIG. 9 shows an exemplary outflow bypass conduit within the manifold portion of the electrochemical cell.

As shown in FIG. 9, the outflow bypass conduit 48 extends under the manifold assembly 114. Air exiting the air chamber is diverted into the bypass inlet 47 and flows through the conduit to the bypass outlet 49. The air then flows into the HEM 50 or a portion is diverted into the inflow air through the recirculation feature. The air chamber extends across a portion of the length of the cell housing.

Figure 10:
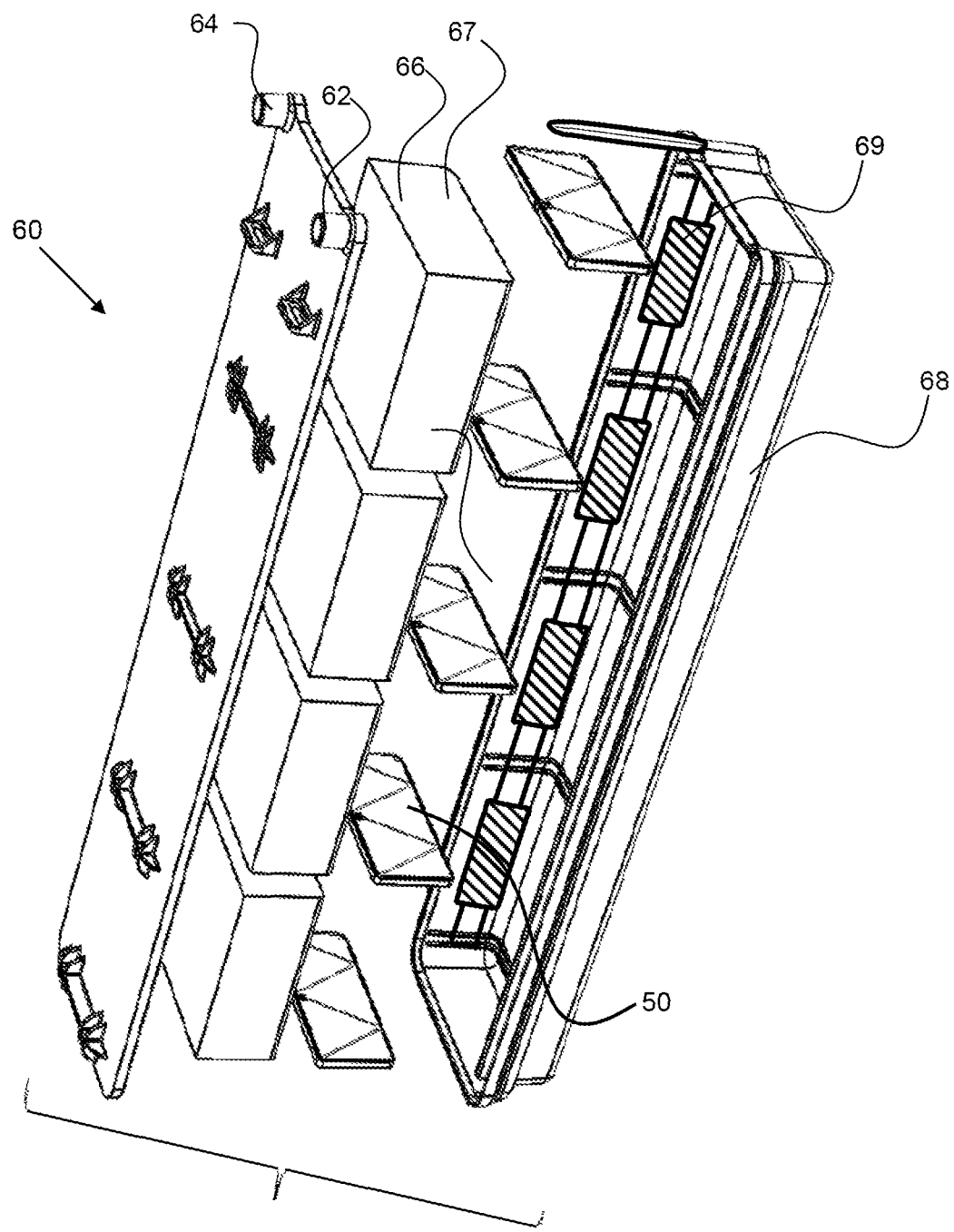
FIG. 10 shows an exploded view of an exemplary scrubber having a heating element.

As shown in FIG. 10, a scrubber module 60 may comprise a heating element 69 that is configured to be coupled with the control system to heat the scrubber media 66. The scrubber media as shown is a reversible scrubber media 67, a scrubber media that absorbs carbon dioxide that may be driven off by increasing the temperature of the reversible scrubber media. The heating element 69 extends within the scrubber module housing 68 to provide effective heating of the scrubber media, but may be configured on an exterior surface of the housing. A heater connector enables the heating element to be easily coupled with the control system when the scrubber module is attached to the cell housing.

The control system may turn on the heating elements and control the valves within the electrochemical cell to control flow through the scrubber while being heated to effectively remove the carbon dioxide from the scrubber media.

Figure 11:
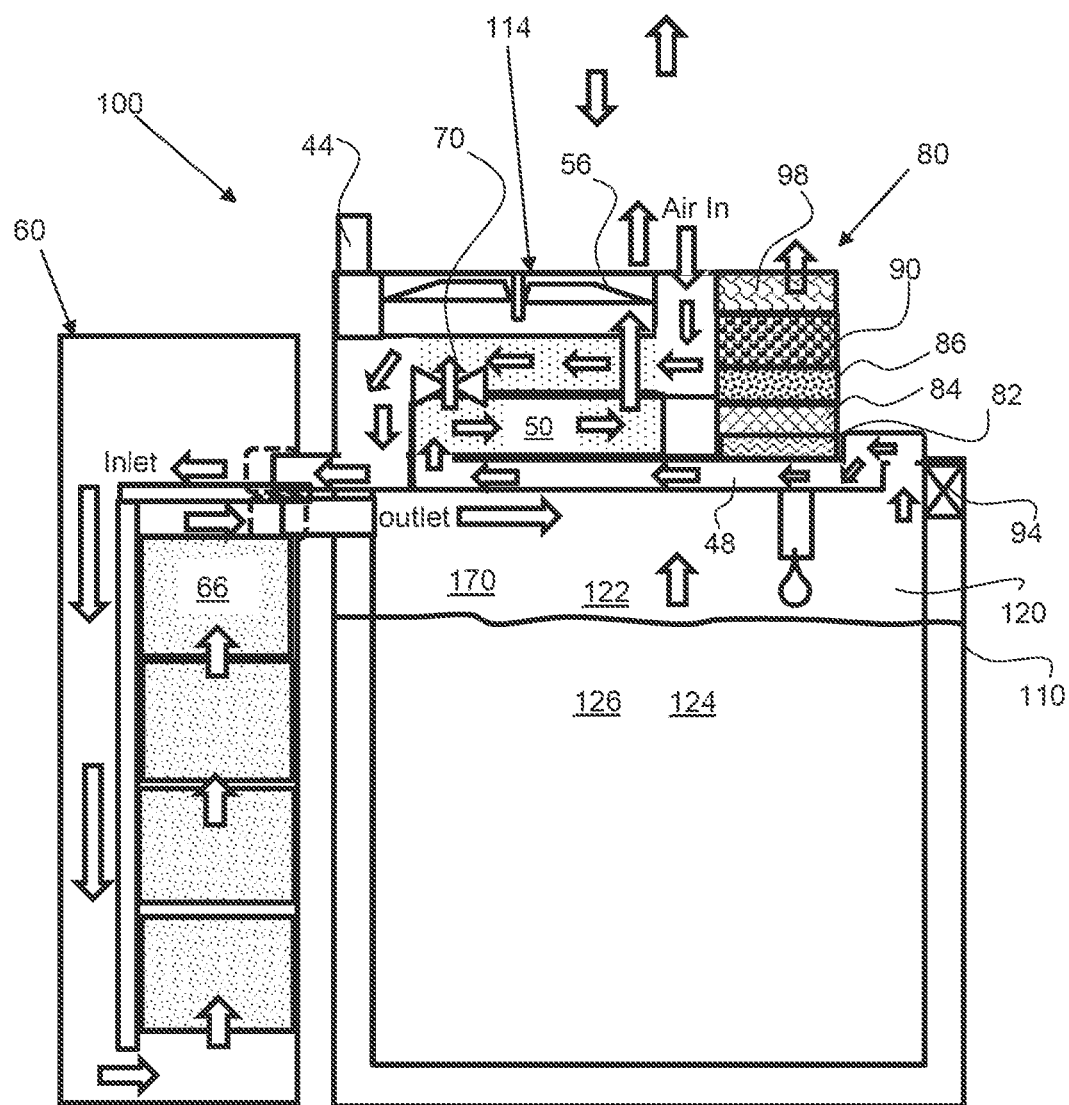
FIG. 11 shows a cross-sectional schematic of an exemplary electrochemical cell having a moisture and carbon dioxide management system.

As shown in FIG. 11, air flows into the manifold assembly 114 of the electrochemical cell 100, through the scrubber 60 and then into the air chamber 170. As shown, air enters the air chamber 170 configured within the interior chamber 122 of the cell housing 110. The air flows across the air chamber and exits the interior chamber where it enters the outflow bypass conduit 48. A pressure relief valve 94 is configured to vent pressure from within the cell chamber 120 when exceeding a threshold limit. Also shown in FIG. 11 is a mist elimination system 80 that is configured to reduce and/or eliminate mist that evolves from the surface of the electrolyte due to bubbling of gasses to the surface and to prevent or substantially prevent leakage of the electrolyte 126 in the event of an upset. The mist eliminator system comprises a safety vent 82 that is in communication with the interior chamber 122 of the cell housing 110, and therefore exposed to the ionically conductive medium 124 and/or gas space there above. An exemplary safety vent provides a tortuous conduit path that will slow the transfer of any liquid electrolyte to the downstream portions of the mist eliminator system. Another exemplary safety vent comprises a ball valve that allows air to go around the ball due to a pressure differential when upright, and when upset, seals when the ionically conductive media liquid forces the ball against a seat to prevent or substantially prevent liquid loss. A filter 84 is configured downstream of the safety vent and may be a concave filter that will drain absorbed ionically conductive medium back into the anode chamber, as described in U.S. Pat. No. 9,269,998, incorporated by reference herein.

The exemplary mist elimination system 80 comprises a hydrogen recombination portion 86, comprising a hydrogen recombination catalyst that reacts with any hydrogen to form water. The catalyst may be configured on a support material such as particles or surfaces of the mist elimination system that are exposed to the gas exiting the cell housing from the anode space. Air may enter in to the mist elimination system through the hydrophobic filter 98 to provide the necessary oxygen for the hydrogen recombination reaction. The hydrophobic filter may prevent or substantially prevent water ingress into the electrochemical cell.

The exemplary mist elimination system comprises a neutralizer portion 90 comprising a neutralizer media 91, such as an acid, configured to neutralize the ionically conductive medium. For example, the ionically conductive medium may comprise a potassium hydroxide solution that is caustic, and a neutralizer may be a solid acid or acid on carbon or some other support material. The neutralizer is configured to reduce any reactive gases that may exhaust from the anode chamber or the chamber containing the ionically conductive medium.

FIG. 12 shows a block diagram of an exemplary moisture (water) management system 59, and a carbon dioxide management system 13. The two systems may work in tandem to conserve moisture and provide a carbon dioxide depleted inflow stream to the electrochemical cell. The moisture management system increases the humidity of inflow air by drawing moisture from the outflow exhaust of the cell, which is typically warm and humid, when the cell is operating. The HEM module 50 has an inflow side 51 and an outflow side 52 separated by a HEM 54. The moisture level and carbon dioxide level of inflow air may further be adjusted by recirculating at least a portion of the outflow through a recirculation feature 70, such as a valve or baffle.

As shown, the recirculation feature is upstream, prior to the inflow air reaching the HEM. Recirculated outflow will have a relative high moisture content and a lower carbon dioxide concentration than ambient air, in most cases. The moisture management system also incorporates a scrubber 60, wherein the scrubber media absorbs moisture from the air inflow. Scrubber media works more effectively when properly hydrated. In addition, the absorbed moisture in the scrubber media may be periodically desorbed and passed into the electrochemical cell chamber 120, and subsequently through the rest of the moisture management system. The moisture management system further comprises an inflow bypass conduit 75 and valve 76. The control system 102, comprising a microprocessor 106 may open and close valves, including the inflow bypass valve and or a recirculation valve 72 to efficiently operate the system and conserve moisture. For example, the scrubber may be detached and the controller may divert inflow air through the bypass conduit to the inflow port 65 of the cell chamber 120.

It will be apparent to those skilled in the art that various modifications, combinations and variations can be made in the present disclosure without departing from the spirit or scope of the disclosure. Specific embodiments, features and elements described herein may be modified, and/or combined in any suitable manner. Thus, it is intended that the present disclosure cover the modifications, combinations and variations of this disclosure provided they come within the scope of the appended claims and their equivalents.

What is claimed is:

1. An electrochemical cell comprising:
    a cell housing defining an air chamber, an inflow port, and an outlet, the inflow port and the outlet in fluid communication with one another via the air chamber;
    an electrolyte disposed in the air chamber;
    a pair of electrodes spaced apart from one another in the electrolyte in the air chamber;
    a humidity exchange membrane having an inflow side and an outflow side, the inflow side exposed to air entering the cell housing through the inflow port, the outflow side exposed to air exiting the cell through the outlet, and moisture movable through the humidity exchange membrane from the outflow side to the inflow side; and
    a scrubber including scrubber media in fluid communication between the inflow side of the humidity exchange membrane and the inflow port of the cell housing, and carbon dioxide from air flowing through the scrubber removable by the scrubber media.

2. The electrochemical cell of claim 1, wherein the humidity exchange membrane includes an ionically conductive polymer or perfluorosulfonic acid polymer.

3. The electrochemical cell of claim 1, wherein the scrubber media is irreversible scrubber media.

4. The electrochemical cell of claim 3, wherein the irreversible scrubber media includes soda lime, sodium hydroxide, potassium hydroxide, lithium hydroxide, lithium peroxide, calcium oxide, calcium carbonate, serpentinite, magnesium silicate magnesium hydroxide, olivine, molecular sieves, amines, monothanolamine, and/or combinations thereof.

5. The electrochemical cell of claim 1, wherein the scrubber media comprises a reversible scrubber media.

6. The electrochemical cell of claim 5, wherein the reversible scrubber media comprises amine groups.

7. The electrochemical cell of claim 1, wherein the scrubber includes a heating element.

8. The electrochemical cell of claim 7, wherein the heating element is a passive heating element that directs heat from the cell to the scrubber media.

9. The electrochemical cell of claim 7, wherein the heating element comprises an electric heating element.

10. The electrochemical cell of claim 1, wherein the scrubber is releasably attachable to the cell housing.

11. The electrochemical cell of claim 10, wherein the electrochemical cell is operable with the scrubber detached from the cell housing.

12. The electrochemical cell of claim 1, further comprising a recirculation feature through which a portion of air exiting the cell through the outlet is transferrable to inlet airflow movable over the inflow side of the humidity exchange membrane.

13. The electrochemical cell of claim 12, wherein the portion of air transferrable to the inlet airflow, via the recirculation feature, is adjustable.

14. The electrochemical cell of claim 12, wherein the recirculation feature is a valve.

15. The electrochemical cell of claim 12, wherein the recirculation feature is a baffle.

* * * * *